(12) United States Patent
Berckmann (10) Patent No.: US 11,398,227 B1
(45) Date of Patent: Jul. 26, 2022

(54) COMPRESSION FOR TRANSLATION SYSTEMS

(71) Applicant: Amazon Technologies, Inc., Seattle, WA (US)

(72) Inventor: Tucker Berckmann, Providence, RI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 134 days.

(21) Appl. No.: 17/027,060

(22) Filed: Sep. 21, 2020

(51) Int. Cl.
| | |
|---|---|
| *G10L 15/00* | (2013.01) |
| *G10L 15/183* | (2013.01) |
| *G06F 16/2457* | (2019.01) |
| *G10L 19/00* | (2013.01) |
| *G10L 15/16* | (2006.01) |
| *G10L 15/22* | (2006.01) |
| *G06N 3/02* | (2006.01) |
| *G06F 40/58* | (2020.01) |
| *G10L 25/30* | (2013.01) |
| *G06F 40/55* | (2020.01) |
| *G10L 15/26* | (2006.01) |

(52) U.S. Cl.
CPC ...... *G10L 15/183* (2013.01); *G06F 16/24575* (2019.01); *G06N 3/02* (2013.01); *G10L 15/16* (2013.01); *G10L 15/22* (2013.01); *G10L 19/00* (2013.01); *G06F 40/55* (2020.01); *G06F 40/58* (2020.01); *G10L 15/26* (2013.01); *G10L 25/30* (2013.01)

(58) Field of Classification Search
CPC combination set(s) only.
See application file for complete search history.

*Primary Examiner* — Vu B Hang
(74) *Attorney, Agent, or Firm* — K&L Gates LLP (57) ABSTRACT

Devices and techniques are generally described for translation compression. In various examples, first text comprising at least one word composed in a first language may be determined. In some examples, first data that indicates a target language for translation may be received. First symbol data representing an encoded translation of the first text in the target language may be retrieved from memory. A symbol decoder may be determined for decoding the first symbol data. Second text may be generated by inputting the first symbol data into the symbol decoder. The second text may represent a translation of the first text into the target language. In various examples, the second text may be output as video and/or audio.

20 Claims, 8 Drawing Sheets

COMPRESSION FOR TRANSLATION SYSTEMS

BACKGROUND

Machine translation involves the use of computers to translate text and/or speech from one language to another. Simple replacement of one word with a corresponding word in the target language rarely generates a high quality translation as semantic and contextual information is often lost. In addition, many words do not have direct equivalents in the target language and/or have different connotations. Accordingly, machine translation systems that consider the meaning of the entire sentence/phrase/segment often product higher quality translations relative to simple word-for-word substitutions.

DETAILED DESCRIPTION

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Neural machine translation (NMT) is the process of translating an input text sequence composed in one language (the "source" or input text) into an output language (the "target" language) using a neural network. In this context, language (sometimes referred to as "spoken language") is understood to mean a natural language as used by humans for communication, such as English, French, Czech, etc. An example of NMT would be translating a news article from French into English via a neural network running on one or more computing devices.

One of the advantages of NMT is that it can provide a high quality translation quickly (on the order of seconds or less) without any human input or supervision. Current examples of NMT systems include Google Translate and Amazon Translate. FIG. 1B, discussed below, provides an example of an NMT system that can be used in accordance with various techniques described herein.

In various examples, there may situations in which different users would like to have text and/or audio translated into a variety of different languages. For example, consider a multilingual user comment forum provided on the internet. A user may wish to read comments posted in a variety of different languages. However, the user may not understand all of the different languages in which the comments have been composed. One approach would be to continually translate all comments into a variety of different languages and to store the translations in memory for the forum. However, this approach may be prohibitive in terms of memory requirements. For example, if a forum offers a choice of 80 languages, 80 copies of each message (translated into each of the 80 languages) may be stored, increasing the storage requirements of the platform 80-fold.

An alternative approach may be to store a single copy of each comment (e.g., in the language in which the comment was originally recorded) and to translate the comment in an on-demand fashion every time a user requested to have the comment translated into a different language. However, given the processing power used to translate sentences, this alternative may be infeasible and/or computationally expensive. Additionally, in such a scheme, it may not be possible to search for content in languages other than the language in which the content has been stored.

Described herein are approaches that may be used to alleviate the above-described problems. In one approach, compressed representations (e.g., symbol data) representing translations of text may be stored instead of storing alphanumeric text directly. In various examples, when a user requests a translation of text (or audio that can be transcribed into text) into a target language, the compressed representation of the translated text in the target language may be retrieved from memory. Additionally, the appropriate symbol decoder for decoding the compressed representation may be determined and may be used to transform the compressed representations (e.g., symbols) back into text and/or audio in the target language.

In various other examples, techniques for searching text that is encoded using the compression scheme described above are described. In various examples, search terms (e.g., keywords) may be encoded using the same techniques used to store the compressed representations (e.g., symbols) of the translated text. Additionally, the encoded search terms may be used to generate a set of search terms including all variations of the search term(s) with various possible punctuations. Further, in some examples, a regular expression may be determined by combining continuation symbols of the encoding scheme with the set of search terms including the punctuation permutations. The regular expression may then be used to search the compressed representations of translated text stored in memory.

In various further examples, techniques for achieving compression benefits when using beam search NMT are generally described. Once a particular segment of text has been translated with NMT using beam search, the beam search branches (sometimes referred to as beam search choices) may be stored in memory in association with the text. Thereafter, if another user requests the text to be translated into the same language, the beam search branches may be retrieved and used to transform the beam search into a greedy search. Such an approach does not require that any representation of the previously translated text be stored, and achieves compression benefit by storing only the beam search branches in memory for future NMT.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation. In various examples, the neural networks described herein for machine translation are deterministic.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In various examples, token embeddings may be generated to represent various text described herein for input into the various machine learning models described herein.

Figure 1A:
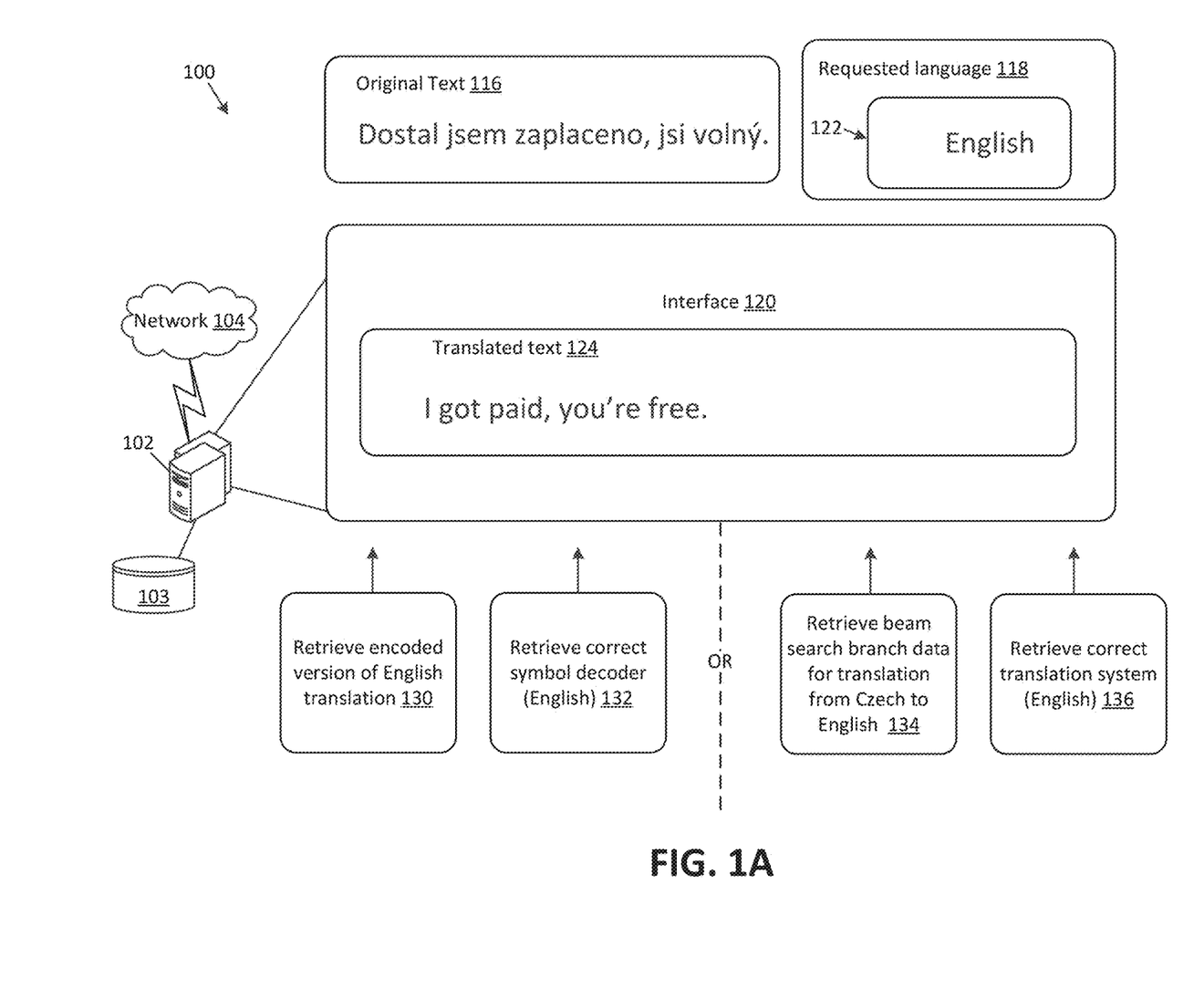
FIG. 1A is a block diagram illustrating a system effective to perform various compression techniques for translation systems, according to various embodiments of the present disclosure.
Figure 1B:
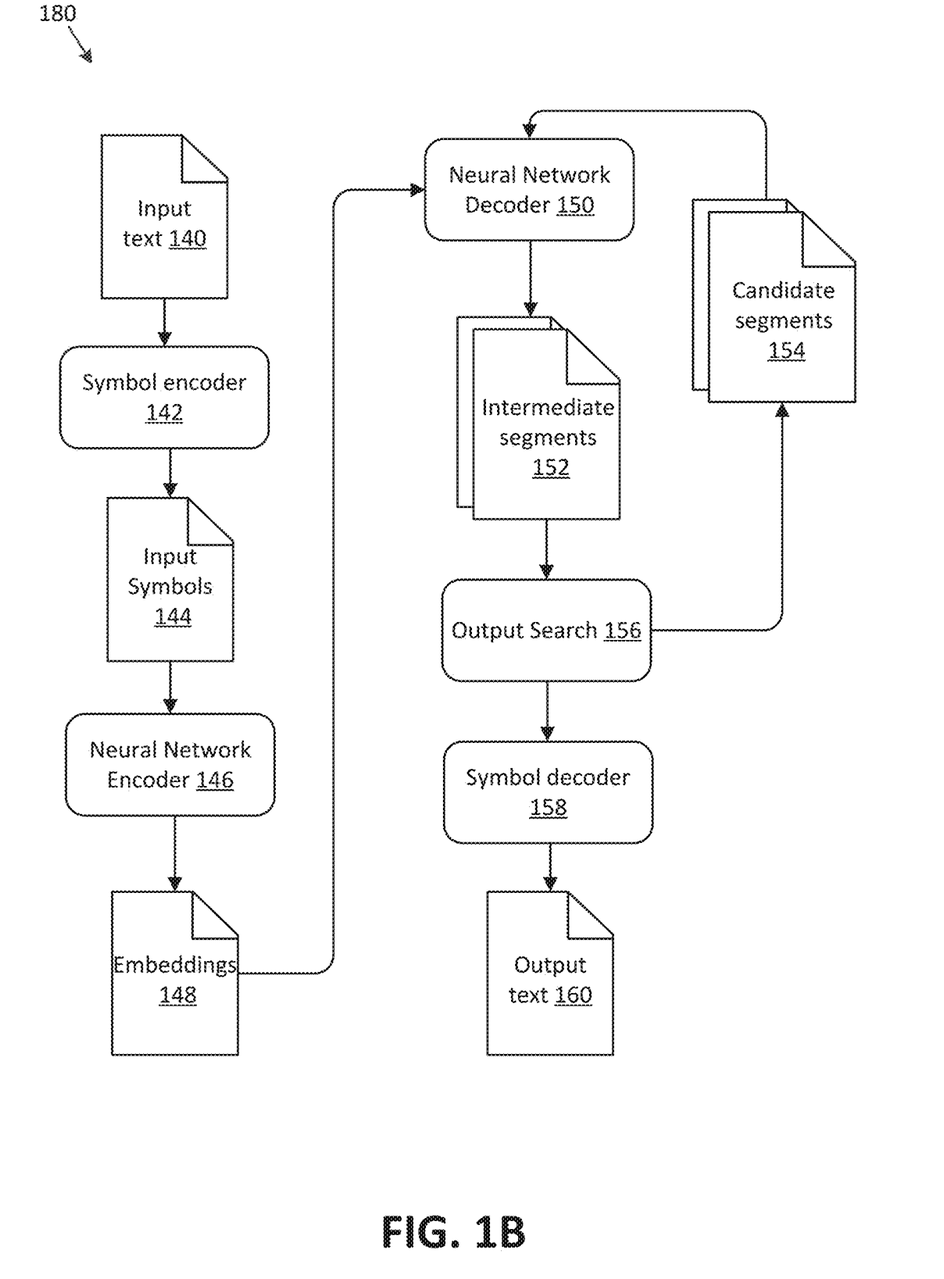
FIG. 1B is a diagram illustrating an example of a neural machine translation system that may be used in accordance with various aspects of the present disclosure.

FIG. 1A is a block diagram illustrating a system 100 effective to perform various compression techniques for translation systems, according to various embodiments of the present disclosure. In various examples, one or more computing devices 102 may display and/or may receive data indicating text to be translated into a target language. For example, computing device(s) 102 may display an interface 120 (e.g., a visual and/or audio interface). The interface 120 may be, for example, an interface of a multi-lingual message board being viewed by one or more users. The computing device(s) 102 may display and/or output audio data representing translated text 124. In the example depicted in FIG. 1A, the original text 116 may be in the Czech language. In various examples, the original text 116 (e.g., text that was originally composed and/or stored on a server in the Czech language) may not be displayed to a user that has indicated that the user prefers a different language (e.g., requested language 118). The original text 116 may be "Dostal jsem zaplaceno, jsi volný." A user may enter a requested language 118 and/or may specify a requested language (e.g., through the user's browser, a portal interface, through a system configuration, in a field 122 of interface 120 and/or some other interface, etc. In the example depicted in FIG. 1A a request has been received to translate text displayed into the English language. Accordingly, instead of displaying the Czech text 116, the interface 124 may display the translated text 124 representing an English translation of the Czech text 116.

In various examples, different compression techniques for the translation of the text 116 to English are shown and described. As described in further detail below, the various compression techniques may achieve benefits in terms of memory requirements and/or computational requirements (e.g., CPU usage) during translation.

In a first example, the text 116 may be translated into a variety of different spoken languages. The translations of the text 116 may be encoded into encoded representations (e.g., symbols). For example, byte-pair encoding (BPE), unigram language model encoding, etc., may be used to encode the translated versions of text 116. A typical byte-pair encoding scheme using, for example, a vocabulary size of 15,000, may represent the translated text 124 "I got paid, you're free." as follows: "I got pa@@ i@@ d, you're fre@@ e." This BPE includes eight white-space separated symbols. Each symbol may be mapped to a 16-bit integer. Eight symbols, each with 16 bits, represents a total of 128 bits if stored in memory. The original sentence (translated text 124—"I got paid, you're free.") includes 24 characters, each encoded using 8 bits, for a total of 192 bits. Accordingly, storing the BPE encoding of translated text 124 rather than the string data represents a compression ratio of 67% (128/192). The numbers of bits used to encode symbols may differ apart from what is specifically described in the various examples included herein. Similarly, the compression ratios are described for illustrative purposes only. Other compression ratios may be achieved using the various techniques described herein depending on the particular techniques, datasets, and/or encoding/decoding techniques used. Similarly, although BPE encoders and/or decoders are sometimes described as the symbol encoders and/or symbol decoders, other symbol encoder and/or decoder techniques may be used in accordance with the present disclosure.

At block 130, the encoded version of the English translation (e.g., the 16 bit symbols encoding "I got pa@@ i@@ d, you're fre@@ e.") may be retrieved. Since the symbol encoder/decoder (e.g., BPE, unigram language model, etc.) is language-specific and may be updated over time using an updated vocabulary, a version may be stored in association with the encoded version of the English translation retrieved at block 130. The version number may be used to lookup the appropriate symbol decoder at block 132 (e.g., a byte-pair decoder). The version number may also correspond to the appropriate target language (English in this example). The symbol decoder may then be used to decode the 16 bit symbols to generate translated text 124 (e.g., "I got paid, you're free") in the target language (e.g., English). Storing encoded versions of the text in various target language for compression benefit during translation is described in further detail below in reference to FIG. 2.

In some other examples, instead of storing compressed representations of text in different target languages, beam search branch data representing beam search branches for a previous translation of the text 116 into a particular target language (e.g., English) may be stored in memory. Thereafter, if a user requests the same translation (e.g., from Czech to English, as shown in the example depicted in FIG. 1A), the beam search branch data for translation from Czech to English may be retrieved (block 134). In addition, a version number of the translation system may be stored in association with the beam search branch data. The version number may be used to retrieve the correct translation system (e.g., for the target language—English) at block 136.

In various examples, the retrieved translation system may be a NMT system (sometimes referred to as an NMT model) for which the retrieved beam search branch data is applicable. As described in further detail below, the beam search branch data allows the NMT to functionally perform a greedy search instead of a recursive beam search during translation, resulting in increased processing efficiency. Additionally, storing simply the branch data instead of the translated text results in a large compression benefit, as described in further detail below. Storing and retrieving beam search branch data for translation compression is described in further detail below in reference to FIG. 4.

In various examples, network 104 is a wide area network, such as the Internet, while in other embodiments, the network 104 is a local area network (LAN) over which search translation requests may be sent and search results may be returned. In some further embodiments, network 104 may be a combination of the Internet and a LAN.

The one or more computing devices 102 may be effective to implement the various compression techniques described herein for translation systems. In various examples, memory 103 may be a non-transitory computer-readable memory that may store instructions that, when executed by at least one processor of the computing devices 102, are effective to perform the various compression techniques described herein.

FIG. 1B is a diagram 180 illustrating an example of a neural machine translation system that may be used in accordance with various aspects of the present disclosure. In various examples, input text 140 may be received for translation to a target spoken language. For example, a user may enter an arbitrary set of input sentences and/or words in a first natural language (e.g., Spanish). The translation of the input text 140 may be initially unknown, as it may be the job of the NMT system to generate the translation into the target language (e.g., English).

The symbol encoder 142 (e.g., a byte-pair encoder, unigram language model encoder, etc.) may convert the input sentences into a sequence of input symbols 144 (e.g., integers). Different symbol encoders 142 may be used in accordance with the various techniques described herein. For example, BPE may be used to transform the input text 140 into a set of input symbols 144 with each symbol comprising 16 bits. In another example, each unique word in the source language may be mapped to a separate integer. In various examples, subword encodings may be used. In another example, a unigram language model may be used to encode input text into symbols.

The input symbols may be input into a neural network encoder 146 (e.g., a long short term memory (LSTM) model, a gated recurrent unit (GRU), and/or some other recurrent neural network (RNN)). The neural network encoder 146 may encode the input symbols 144 into a set of embeddings 148 that describes the structure and semantic meaning of the original input text 140. Embeddings 148 are sometimes referred to as "hidden state" representations or data in the context of NMT.

The neural network decoder 150 takes the embeddings 148 as input and generates intermediate segments 152 in a word-by-word fashion. If the neural network decoder 150 is using a greedy search algorithm, the output search component 156 (e.g., a Softmax layer) may select a candidate at each time step (e.g., for each word). In various examples, the candidate may be selected based on probability (e.g., the candidate with the highest probability may be selected). However, use of the greedy search algorithm to translate an entire sentence often produces suboptimal results. Alternatively, the beam search algorithm selects multiple alternatives for the input sequence (e.g., the embeddings 148) at each timestep. The beam search algorithm selects the b best hypotheses (among intermediate segments 152) at each timestep, where b is described as the beam "width."

For example, the output search component 156 (e.g., Softmax) may determine the highest probability among the intermediate segments 152 at each time step if a greedy search is used. In such a case, the candidate segment 154 selected by output search component 156 from among intermediate segments 152 for a particular timestep is the highest probability intermediate segment 152.

In another example, if a beam search is used with beam width three, the top-three highest probability intermediate segments 152 may be selected as candidate segments 154 at each timestep by output search component 156. The probabilities may be conditional probabilities under the condition of the previous timesteps in candidate segments 154. After all candidate segments 154 considered by the beam search are completed (e.g., after each of the candidate segments 154 includes a stop token), the symbols representing the translated text (e.g., BPE symbols) may be sent to a symbol decoder 158. The symbol decoder 158 may be specific to the target language and may correspond to the symbol encoder 142. The symbol decoder 158 may be used to generate output text 160 representing the input text 140 translated into the target language.

The primary logic of the NMT process in FIG. 1B is included in the neural network decoder 150. Neural network decoder 150 implements a statistical language model of the target language. If the translated sentences (y) are defined as the sequence of tokens with the highest probability, given the source sentences (x), the decoder determines:

$$p(\vec{y}) = p(y_1, \ldots, y_n) = \prod_{t=1}^{n} p(y_t | y_1, \ldots, y_{t-1}, \vec{x})$$

The decoder implements only one piece of this calculation. Specifically, given a sequence of previous symbols (e.g., at previous timesteps), and the source sentences, the decoder calculates the probability of the next symbol. The simplest way to generate the target sentences would be to choose the most likely next symbol, insert it into the list of previously calculated symbols (e.g., as a candidate segment 154), and then repeat the process. This method is referred to as a greedy search, but it is inadequate to produce the highest quality translations.

An improvement over the greedy search is the beam search. Given a beam width "b," the beam search process calculates the likelihood of the next symbol on "b" separate sequences, instead of a single sequence, pruning the candidates at each step. This process greatly improves the final translation, but requires additional calculations. For example, if the beam search width is five, then five times as much computational power is needed to complete the translation. Beam branch data and/or beam choices, as referred to herein, refers the selection made by output search component 156 at each timestep among the "b" sequences.

For example, consider the input text 140, in French, "Je vais au magasin." Neural network decoder 150 may use a beam search of beam width b=3. The neural network decoder 150 may generate encoded output symbols. However, for the current example, English words are used for ease of illustration. At the first time step, the output may be: [I, me, we], representing the three words selected as the three best hypotheses in the target language for the current timestep (selected by output search component 156 (e.g., Softmax)). Accordingly, the set [I, me, we] may be the candidate segments 154 selected from the intermediate segments 152 at the first time step. At the second time step, the output may be [I am, We will, I can]. At the third time step, the output may be [I am visiting, We will go, I am going]. Eventually, the final output may be selected as "I am going to the store", in the target language (English). In this example, the beam search branch data (if zero indexed) may be stored as [0, 0, 2, . . . ] (or as an encoded representation thereof). This is because at the first timestep, the first branch representing "I" was selected for the final output. At the second time step, the first branch representing "I am" was selected. At the third time step, the third branch representing "I am going" was selected, and so on.

As previously described, the output of output search component 156 may be encoded in symbol representations (e.g., 16-bit representations of BPE symbols). It should be appreciated that other symbol encodings (e.g., unigram language model encodings) and different numbers of bits may be used apart from those specifically described in the current example. Symbol decoder 158 may decode the symbol representations to generate output text 160 in the target language.

Figure 2:
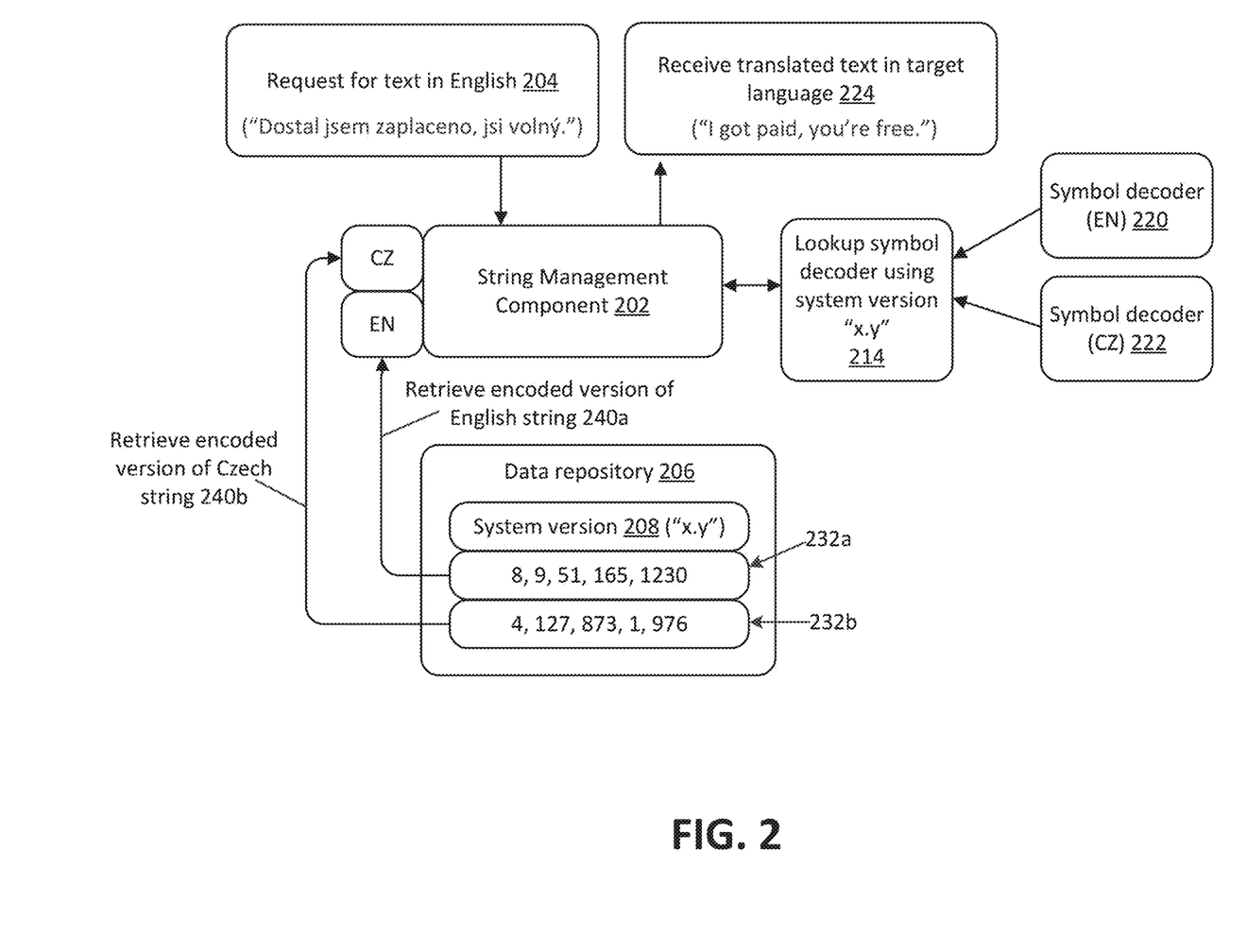
FIG. 2 is a block diagram illustrating an example process for decoding text using compression techniques described herein, in accordance with various embodiments of the present disclosure.

FIG. 2 is a block diagram illustrating an example process for decoding text using compression techniques described herein, in accordance with various embodiments of the present disclosure. As previously described, in some examples, symbol data comprising an encoded representation (e.g., an encoded translation) of text in various target languages may be stored in memory. Compression techniques used to generate such symbol data may mitigate the space requirements for storage of translations in all target languages (e.g., for a particular forum). For example, if translations for 80 target languages are to be maintained, storing symbol data target language representations of text (e.g., encoded using BPE) may result in an average compression ratio of 56% (based on empirical data).

FIG. 2 depicts an example process for retrieving and decoding such symbol data. In the example depicted in FIG. 2, a user may request that text be translated into a target language, such as English (block 204). In the example, the text may initially be in a first language (e.g., Czech, in FIG. 2). The request may be sent to string management component 202 along with an indication of the target language. String management component 202 may retrieve the encoded version of the relevant string (representing the translation in the target language). For example, if the target language is English, string management component 202 may retrieve encoded version of English string 240*a*. In a different example, if the target language is Czech, string management component 202 may retrieve encoded version of Czech string 240*b* (note that in this case, the initial text in block 204 may be in a different language other than Czech). Symbol data 232*a* may represent symbols of a BPE encoding (or other symbol encoding) of the English translation of the text in block 204. Similarly, symbol data 232*b* may represent symbols of a BPE encoding (or other symbol encoding) of the Czech text in block 204.

Next, the string management component 202 may lookup the system version 208 (e.g., version x.y) associated with the text from block 204 in data repository 206. The string management component 202 may use the system version to lookup the appropriate symbol decoder for the target language (block 214). Accordingly, the string management component 202 may retrieve the symbol decoder (EN) 220 and may use the symbol decoder (EN) 220 to decode the symbol data 232*a* to generate the translated text in the target language 224. Symbol decoder (CZ) 222 is also depicted, which may be used to decode symbol data encoded from the Czech language.

Figure 3:
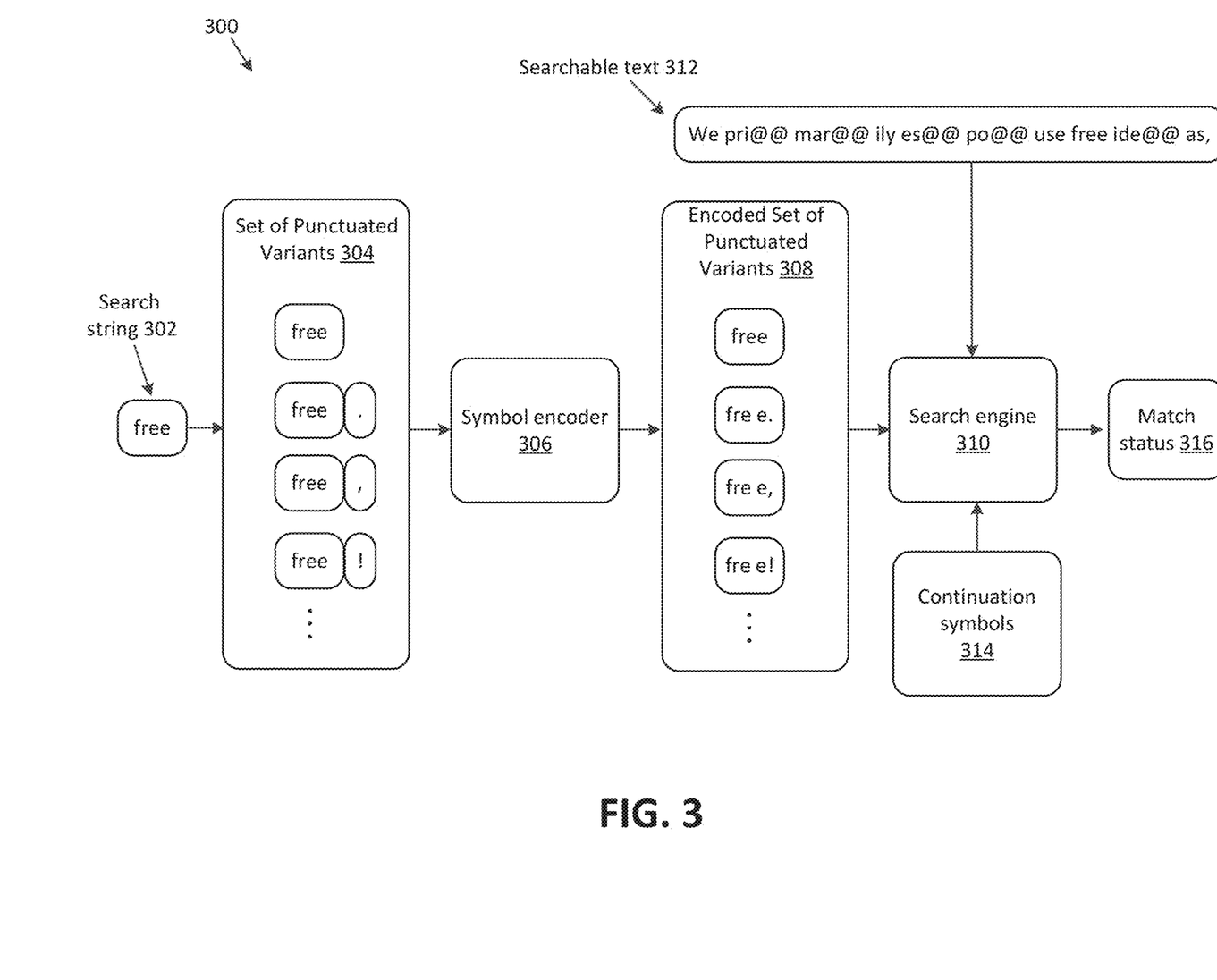
FIG. 3 depicts a block diagram illustrating an example process for searching encoded representations of text, in accordance with various embodiments of the present disclosure.

FIG. 3 depicts a block diagram illustrating an example process 300 for searching encoded representations of text, in accordance with various embodiments of the present disclosure. It may be useful to search text (e.g., messages/comments in a multilingual forum) for keywords. This may at first seem infeasible using the compression scheme described above in reference to FIG. 2. However, process 300 provides techniques that may be used to search the symbol encodings stored in memory using a given search term or terms.

A search string 302 may be provided. Search string 302 may be text data comprising one or more keywords. In the example in FIG. 3, search string 302 is the text "free". A set of punctuated variants 304 of the search string 302 with various added punctuation marks may be added. For example, for the search string 302 "free", the set of punctuated variants 304 may include [free., free,, free!, free?, free-, . . . ]. The set of punctuated variants 304 may be generated since the symbol encoder 306 may encode search string 302 differently depending on the punctuation used in conjunction with the keyword(s).

The symbol encoder 306 may be the same symbol encoder used to encode the particular language of the search string 302 when storing the various symbols in memory (e.g., when generating the symbols in the search space). The symbol encoder 306 generates the encoded set of punctuated variants 308 (which can be described as the set E of search data). Another set, S, of continuation symbols 314 may be determined from all continuation symbols known to the symbol encoder 306. The continuation symbols 314 may be used to ensure that the search term is not a subcomponent of another word. For example, when searching for the keyword "sense" a user may not want the term "essence" to be returned for the search. Accordingly, a check may be performed by the search engine 310 to ensure that the symbol prior to the symbol for "sense" is not a continuation symbol.

Search engine 310 applies a regular expression of the form $\{s_f \notin S, \emptyset\}\{s_v \in E\}$ to the search string. The searchable text 312 (which has been previously encoded using symbol encoder 306, as described above) may be searched using the regular expression. At block 316, a match status is determined. If a symbol in searchable text 312 matches a member of the search data composed using the regular expression, a match is found and the symbol may be decoded (e.g., using the process described above in FIG. 2) and returned in response to the search.

Figure 4:
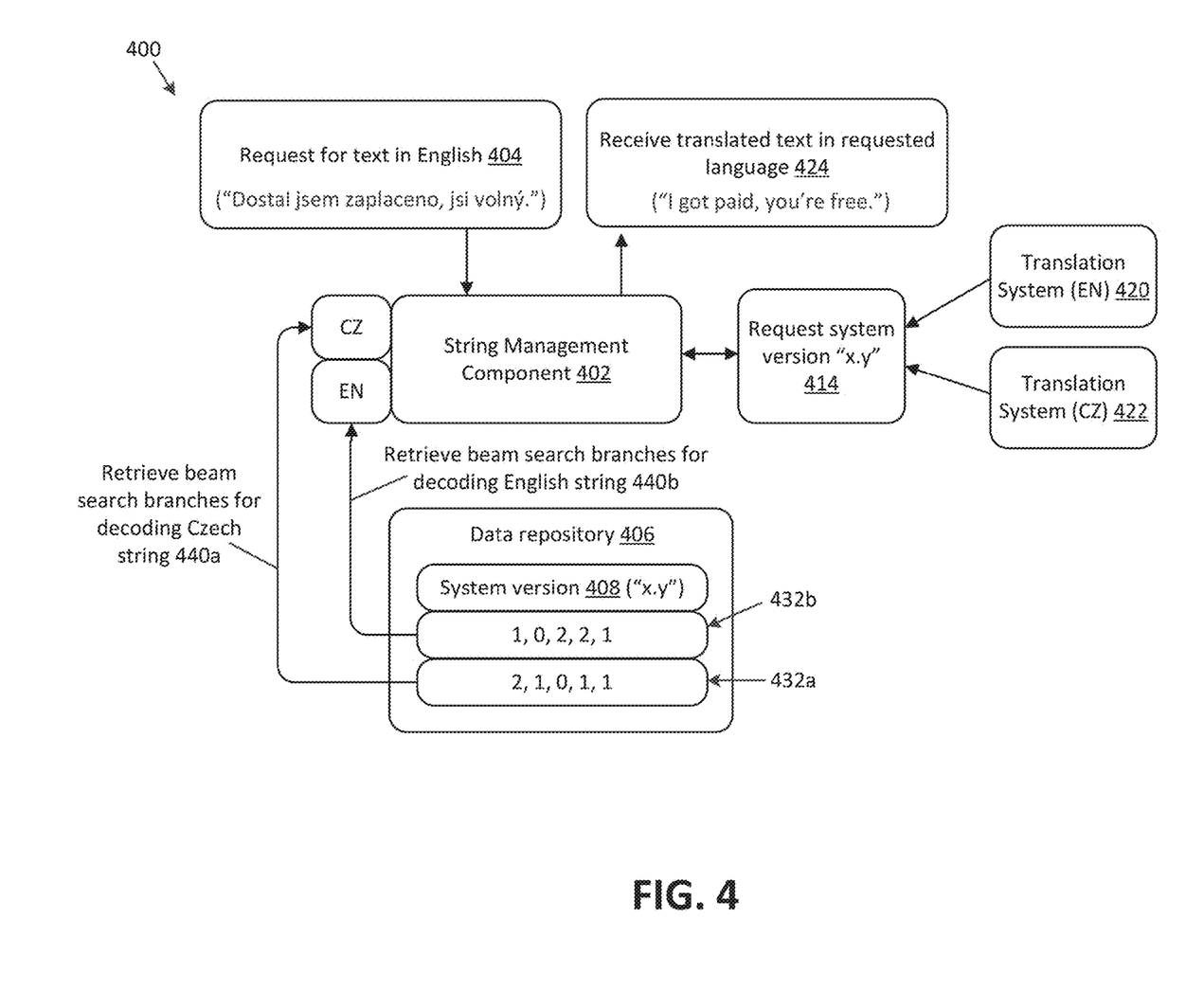
FIG. 4 depicts another block diagram illustrating another example process for decoding text using compression techniques for neural machine translation, in accordance with various embodiments of the present disclosure.

FIG. 4 depicts another block diagram illustrating another example process 400 for decoding text using compression techniques for neural machine translation, in accordance with various embodiments of the present disclosure.

In the example depicted in FIG. 4, a user may request that text be translated into a target language, such as English (block 404). In the example, the text may initially be in a first language (e.g., Czech, in FIG. 4). The request may be sent to string management component 402 along with an indication of the target language. Instead of retrieving the translated text or an encoded version of the relevant string (as in FIG. 2), in the example depicted in FIG. 4, string management component 402 may retrieve the beam search branches (e.g., branch data) for decoding the string in the relevant language.

For example, if the target language is English, string management component 402 may retrieve the beam search branches 432b for decoding the English string 440b. As previously described, the branch data may represent the candidate segments selected by the NMT decoder at each relevant timestep. Accordingly, having the branch data effectively transforms the beam search performed by the neural network decoder into a greedy search.

In a different example, if the target language is Czech, string management component 402 may retrieve the beam search branches 432a for decoding the Czech string 440a. As previously described, the branch data may represent the candidate segments selected by the NMT decoder at each relevant timestep during a previous NMT for the text in block 404.

Next, the string management component 402 may lookup the system version 408 (e.g., version x.y) associated with the text from block 404. The system version 408 may be stored in the data repository 406 in association with the branch data that relates to the text from block 404. The string management component 402 may use the system version to look up the appropriate translation system for the target language (block 414). Accordingly, the string management component 402 may retrieve the translation system 420 (e.g., an NMT system, as depicted in FIG. 1B) and may use the translation system (EN) 420 to translate the text from block 404 into text in the target language 424 (e.g., English, in FIG. 4). Translation system (CZ) 422 is also depicted, which may be used to translate text into the Czech language.

Figure 5:
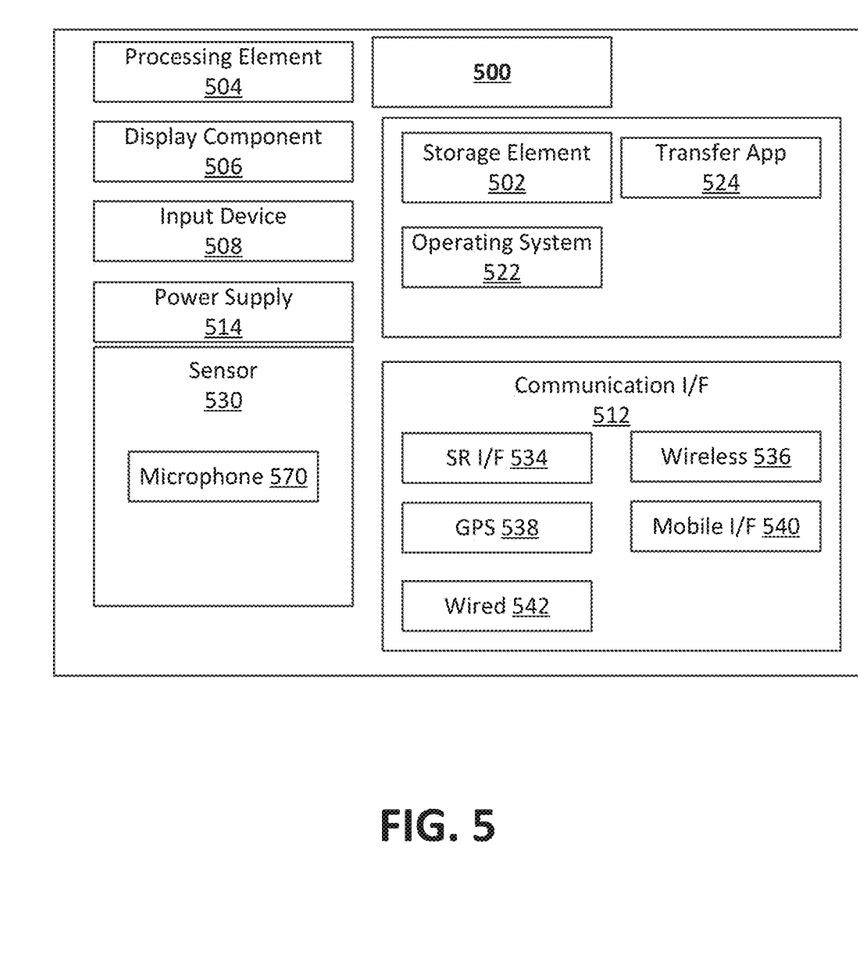
FIG. 5 is a block diagram showing an example architecture of a computing device that may be used in accordance with various embodiments described herein.

FIG. 5 is a block diagram showing an example architecture 500 of a computing device that may be used, at least in part, to provide compression for translation systems as described herein, in accordance with various aspects of the present disclosure. It will be appreciated that not all devices will include all of the components of the architecture 500 and some user devices may include additional components not shown in the architecture 500. In an example embodiment, the architecture 500 includes one or more processing elements 504 for executing instructions and retrieving data stored in a storage element 502. The processing element 504 comprises at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. In an example embodiment, the storage element 502 comprises flash memory, random-access memory, disk-based storage, etc. Different portions of the storage element 502, for example, are used for program instructions for execution by the processing element 504, storage of images or other digital works, and/or a removable storage for transferring data to other devices, etc. Additionally, storage element 502 may store various costs, iterative penalty values a, and/or other values determined using the above-described techniques when updating the models and/or storing feature values.

The storage element 502 may also store software for execution by the processing element 504. An operating system 522 may provide the user with an interface for operating the computing device and may facilitate communications and commands between applications executing on the architecture 500 and various hardware thereof. In an example embodiment, a transfer application 524 is configured to receive images, audio, and/or video from another device (e.g., a mobile device, image capture device, and/or display device) and/or from microphone 570 included in the architecture 500.

When implemented in some user devices, the architecture 500 comprises a display component 506. The display component 506 can comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. Example input devices 508 include a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

In an embodiment, the communication interface 512 comprises one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. In an embodiment, a short range interface 534 is configured to communicate using one or more short range wireless protocols such as, for example, near field communications (NFC), Bluetooth®, Bluetooth LE, etc. In an embodiment, a mobile interface 540 is configured to communicate utilizing a cellular or other mobile protocol. A Global Positioning System (GPS) interface 538 may be in communication with one or more earth-orbiting satellites or other suitable position-determining systems to identify a position of the architecture 500. In an embodiment, a wired communication module 542 is configured to communicate according to the USB protocol or any other suitable protocol.

The architecture 500 may also include one or more sensors 530 such as, for example, one or more position sensors, image sensors, and/or motion sensors. A microphone 570 is shown in FIG. 5, by way of example.

As noted above, multiple devices may be employed in a single system. In such a multi-device system, each of the devices may include different components for performing different aspects of the system's processing. The multiple devices may include overlapping components. The components of the translation compression systems, as described herein, are exemplary, and may be located as a stand-alone device or may be included, in whole or in part, as a component of a larger device or system.

Figure 6:
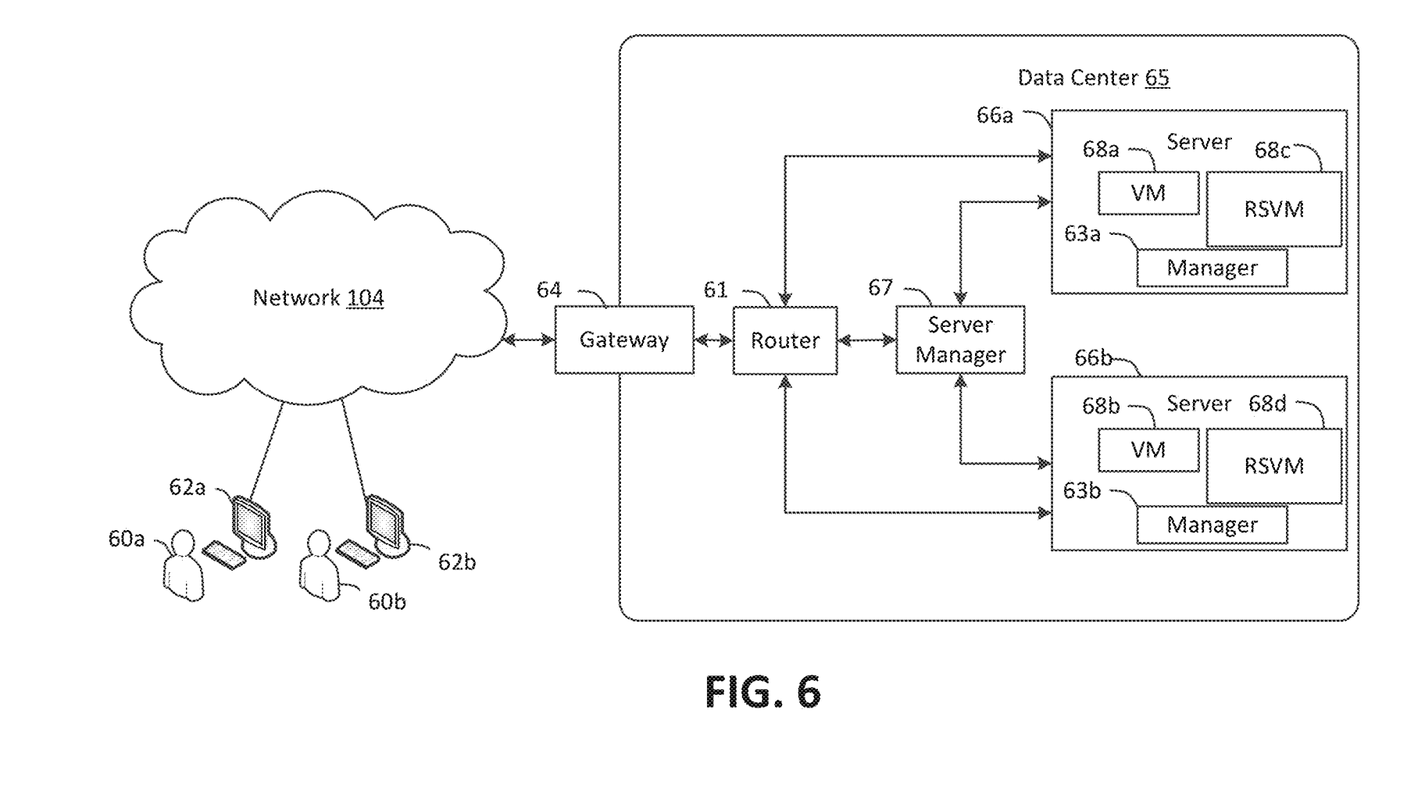
FIG. 6 is a diagram illustrating an example system for sending and providing data that may be used in accordance with the present disclosure.

An example system for sending and providing data and performing various computer processing techniques will now be described in detail. In particular, FIG. 6 illustrates an example computing environment in which the embodiments described herein may be implemented. For example, the computing environment of FIG. 6 may be used to provide compression for translation systems as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the translation compression techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution platform directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 7:
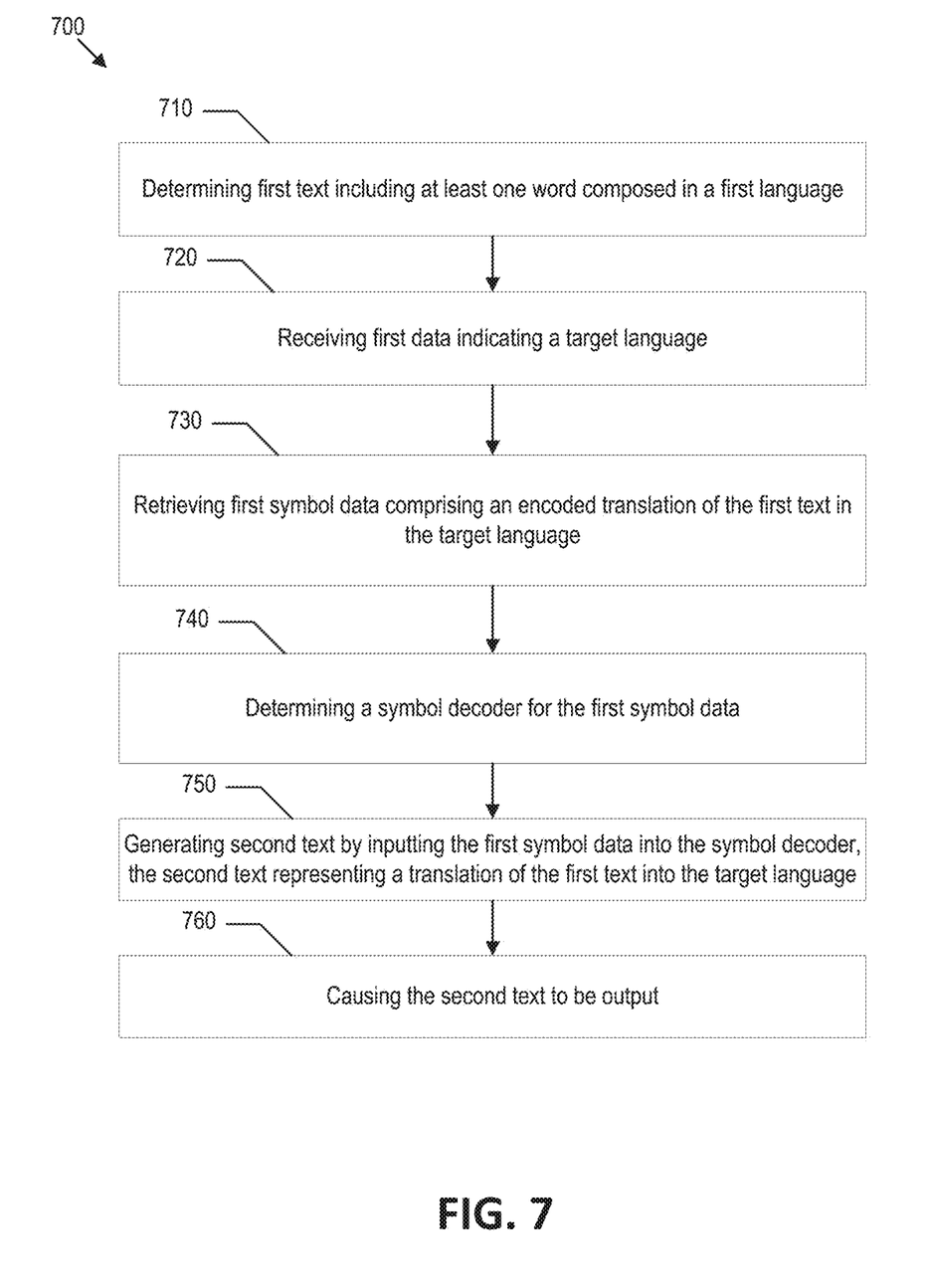
FIG. 7 is a flow chart illustrating an example process for decoding text using compression techniques described herein, in accordance with various aspects of the present disclosure.

FIG. 7 is a flow chart illustrating an example process 700 for providing compression for translation systems, in accordance with various embodiments of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which first text may be determined. The first text may include at least one word composed in a first language. For example, the first text may be text selected by a user for translation from a current language into a target language.

Process 700 may continue at action 720, at which first data indicating a target language may be received. At action 720, the user may select (e.g., via a graphical user interface and/or via a voice interface) a target language into which the first text should be translated.

Process 700 may continue at action 730, at which first symbol data may be retrieved from a memory. The first symbol data may include an encoded version of the first text in the target language. For example, the first symbol data may comprise a BPE of the first text. Accordingly, the first symbol data may comprise one or more 16-bit integer symbols. However, other symbol encoding techniques may be used apart from BPE.

Process 700 may continue at action 740, at which a symbol decoder may be determined for the first symbol data. For example, a system version of the symbol decoder may be stored in association with the first symbol data. Accordingly, the system version may be retrieved together with the first symbol data. The system version (or other identifying data) may be used to lookup the relevant symbol decoder for decoding the first symbol data into string data of the pertinent language.

Process 700 may continue at action 750, at which second text may be generated by inputting the first symbol data into the symbol decoder. The symbol decoder may be effective to decode the first symbol data to generate the second text in the target language requested at action 720. Accordingly, the second text may represent a translation of the first text into the target language. Process 700 may continue to action 760 at which the second text may be output. In some examples, the second text may be displayed on a display. In some other examples, the second text may be output (e.g., via a text-to-speech component of a voice assistant) as audio representative of the second text. In some examples, some combination of audio and text may be generated as output.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of language translation compression, comprising:
   determining first text comprising at least one word composed in a first spoken language;
   receiving first data indicating a target spoken language to which to translate the first text;
   retrieving a first byte-pair encoding of a translation of the first text in the target spoken language;
   determining a system version of a byte-pair encoder used to encode the first byte-pair encoding;
   performing a lookup using the system version to determine a byte-pair decoder corresponding to the byte-pair encoder;
   decoding the first byte-pair encoding of the translation to generate second text data in the target spoken language; and
   causing the second text data to be displayed on a display.

2. The method of claim 1, further comprising:
   receiving a search string of text data;
   generating a first set of search data, the first set comprising a first combination of the search string with a first punctuation mark and a second combination of the search string with a second punctuation mark;
   encoding the first set of search data using the byte-pair encoder to generate an encoded first set of search data;
   determining that a member of the encoded first set of search data matches a second byte-pair encoding stored in memory; and
   decoding the second byte-pair encoding to generate third text data in the target spoken language.

3. The method of claim 2, further comprising:
   determining a second set of continuation symbols for the byte-pair encoder;
   generating a regular expression by combining the encoded first set of search data with the second set of continuation symbols; and
   searching byte-pair encodings stored in the memory for a byte-pair encoding that matches the regular expression.

4. A method comprising:
   determining a target language for displaying first text;
   retrieving first symbol data from non-transitory computer-readable memory, the first symbol data comprising an encoded version of the first text in the target language that was previously translated into the target language using neural machine translation;
   determining a symbol decoder for the first symbol data;
   generating second text by inputting the first symbol data into the symbol decoder, the second text representing a translation of the first text into the target language; and
   causing the second text to be output.

5. The method of claim 4, further comprising:
   generating the first symbol data using a neural machine translation model; and
   storing the first symbol data in a non-transitory computer-readable memory in association with the first text.

6. The method of claim 4, wherein the first symbol data comprises a byte-pair encoding of the translation of the first text into the target language.

7. The method of claim 6, further comprising:
   determining a system version associated with the first symbol data; and
   determining the symbol decoder using the system version, wherein the symbol decoder is a byte-pair decoder.

8. The method of claim 4, further comprising:
receiving a search string of text data;
generating a first set of search data, the first set comprising a first combination of the search string with a first punctuation mark;
encoding the first set of search data to generate an encoded first set of search data;
determining that a member of the encoded first set of search data matches a symbol encoding stored in memory; and
decoding the symbol encoding to generate third text in the target language.

9. The method of claim 8, further comprising:
determining a second set comprising at least one continuation symbol;
generating a regular expression by combining the encoded first set of search data with the second set; and
searching the memory for a second symbol that matches the regular expression.

10. The method of claim 4, further comprising:
storing, for the first text, respective symbol data for each language of a set of languages; and
storing, in association with each respective symbol data, a system version corresponding to a respective symbol decoder for decoding the respective symbol data.

11. The method of claim 4, further comprising:
identifying third text;
generating fourth text comprising a translation of the third text into the target language using neural machine translation with beam search; and
storing second data in memory, the second data representing branches selected during the beam search during generation of the fourth text.

12. The method of claim 11, further comprising:
receiving a request to translate the third text into the target language;
retrieving the second data from the memory; and
generating the fourth text using neural machine translation by selecting the branches for the beam search represented by the second data.

13. A system comprising:
at least one processor; and
at least one non-transitory computer-readable memory storing instructions that, when executed by the at least one processor, are effective to:
determine a target language for output of first text;
retrieve first symbol data comprising an encoded version of the first text in the target language that was previously translated into the target language using neural machine translation;
determine a symbol decoder for the first symbol data;
generate second text by inputting the first symbol data into the symbol decoder, wherein the second text represents a translation of the first text into the target language; and
cause the second text to be output.

14. The system of claim 13, the at least one non-transitory computer-readable memory storing further instructions that, when executed by the at least one processor, are further effective to:
generate the first symbol data using a neural machine translation model; and
store the first symbol data in the at least one non-transitory computer-readable memory in association with the first text.

15. The system of claim 13, wherein the first symbol data comprises a byte-pair encoding of the translation of the first text into the target language.

16. The system of claim 15, the at least one non-transitory computer-readable memory storing further instructions that, when executed by the at least one processor, are further effective to:
determine a system version associated with the first symbol data; and
determine the symbol decoder using the system version, wherein the symbol decoder is a byte-pair decoder.

17. The system of claim 13, the at least one non-transitory computer-readable memory storing further instructions that, when executed by the at least one processor, are further effective to:
receive a search string of text data;
generate a first set of search data, the first set comprising a first combination of the search string with a first punctuation mark;
encode the first set of search data to generate an encoded first set of search data;
determine that a member of the encoded first set of search data matches a symbol encoding stored in memory; and
decode the symbol encoding to generate third text in the target language.

18. The system of claim 17, the at least one non-transitory computer-readable memory storing further instructions that, when executed by the at least one processor, are further effective to:
determine a second set comprising at least one continuation symbol;
generate a regular expression by combining the encoded first set of search data with the second set; and
search the at least one non-transitory computer-readable memory for a second symbol that matches the regular expression.

19. The system of claim 13, the at least one non-transitory computer-readable memory storing further instructions that, when executed by the at least one processor, are further effective to:
store, for the first text, respective symbol data for each language of a set of languages; and
store, in association with each respective symbol data, a system version corresponding to a respective symbol decoder for decoding the respective symbol data.

20. The system of claim 13, the at least one non-transitory computer-readable memory storing further instructions that, when executed by the at least one processor, are further effective to:
receive third text;
generate fourth text comprising a translation of the third text into the target language using neural machine translation with beam search; and
store second data in the at least one non-transitory computer-readable memory, the second data representing branches of the beam search selected during generation of the fourth text.

* * * * *